United States Patent
Lim et al.

(10) Patent No.: US 11,790,940 B2
(45) Date of Patent: Oct. 17, 2023

(54) PERPENDICULAR MAGNETIC RECORDING (PMR) WRITER WITH IMPROVED TRAILING SHIELD DESIGN

(71) Applicant: Headway Technologies, Inc., Milpitas, CA (US)

(72) Inventors: Sanghyun Lim, San Jose, CA (US); Yuhui Tang, Milpitas, CA (US); Yaguang Wei, Pleasanton, CA (US); Yue Liu, Fremont, CA (US); Moris Dovek, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 1059 days.

(21) Appl. No.: 16/022,858

(22) Filed: Jun. 29, 2018

(65) Prior Publication Data
US 2018/0308513 A1    Oct. 25, 2018

Related U.S. Application Data

(62) Division of application No. 14/933,758, filed on Nov. 5, 2015, now Pat. No. 10,032,469.

(51) Int. Cl.
*G11B 5/31*       (2006.01)
*G11B 5/127*      (2006.01)

(52) U.S. Cl.
CPC ............ *G11B 5/315* (2013.01); *G11B 5/1278* (2013.01); *G11B 5/3116* (2013.01)

(58) Field of Classification Search
CPC ...... G11B 5/1278; G11B 5/315; G11B 5/3116
See application file for complete search history.

(56) References Cited

U.S. PATENT DOCUMENTS

| | | |
|---|---|---|
| 6,353,511 B1 | 3/2002 | Shi et al. |
| 7,009,812 B2 | 3/2006 | Hsu et al. |
| 7,113,367 B2 | 9/2006 | Yazawa et al. |
| 8,068,312 B2 | 11/2011 | Jiang et al. |
| 8,089,723 B2 | 1/2012 | Schabes |

(Continued)

OTHER PUBLICATIONS

"Effect of 3d, 4d, and 5d transition metal doping on damping in permalloy thin films," by J. O. Rantschler et al., Journal of Applied Physics 101, 033911, Feb. 14, 2007, pp. 1-5.

(Continued)

*Primary Examiner* — Livius R. Cazan
(74) *Attorney, Agent, or Firm* — Saile Ackerman LLC; Stephen B. Ackerman

(57) ABSTRACT

A method of forming a PMR (perpendicular magnetic recording) head that includes a tapered write pole that is fully surrounded by wrapped-around magnetic shields, including laterally disposed side shields, a trailing shield and a leading shield. A layer of high magnetic saturation material (high $B_s$) is formed on the leading edge of the trailing shield and extends rearward, away from the ABS plane to define a cross-sectional write gap shape that is not conformal with the shape of the tapered write pole. The cross-sectional shape of this shield layer enables it to absorb flux from the write pole so that the flux for writing is enhanced and concentrated at the area of the recording medium being written upon and does not extend to adjacent tracks or to downtrack positions at which such flux is not desired.

7 Claims, 4 Drawing Sheets

(56) References Cited

U.S. PATENT DOCUMENTS

| | | | |
|---|---|---|---|
| 8,462,461 B2 | 6/2013 | Braganca et al. | |
| 8,498,079 B1 * | 7/2013 | Song | G11B 5/3146 |
| | | | 360/125.3 |
| 8,582,241 B1 | 11/2013 | Yu et al. | |
| 9,123,358 B1 * | 9/2015 | Liu | G11B 5/1278 |
| 9,508,364 B1 | 11/2016 | Tang et al. | |
| 9,754,612 B2 | 9/2017 | Wei et al. | |
| 10,032,469 B2 | 7/2018 | Lim et al. | |
| 2008/0304179 A1 * | 12/2008 | Miyatake | G11B 5/1278 |
| | | | 360/123.02 |
| 2011/0097601 A1 * | 4/2011 | Bai | G11B 5/1278 |
| | | | 428/815 |
| 2012/0050921 A1 | 3/2012 | Marshall | |

OTHER PUBLICATIONS

"Micromagnetic Analysis of Adjacent Track Erasure of Wrapped-Around Shielded PMR Writers," by Suping Song et al., IEEE Transactions on Magnetics, vol. 45, No. 10, Oct. 2009, pp. 3730-3732.

"Characterization of Adjacent Track Erasure in Perpendicular Recording by a Stationary Footprint Technique," by Yuhui Tang et al., IEEE Transactions on Magnetics, vol. 49, No. 2, Feb. 2013, pp. 744-750.

"Magnetic Damping in Ferromagnetic Thin Films," by Mikihiko Oogane et al., Japanese Journal of Applied Physics, vol. 45, No. 5A, May 9, 2006, pp. 3889-3891.

* cited by examiner

PERPENDICULAR MAGNETIC RECORDING (PMR) WRITER WITH IMPROVED TRAILING SHIELD DESIGN

This is a Divisional Application of U.S. patent application Ser. No. 14/933,758 filed on Nov. 5, 2015, which is herein incorporated by reference in its entirety and assigned to a common assignee.

BACKGROUND

1. Technical Field

This disclosure relates generally to a writer used in perpendicular magnetic recording (PMR) and particularly to the design of shields that improve their performance.

2. Description

Current Perpendicular Magnetic Recording (PMR) writer designs typically employ a main pole surrounded by fully wrapped around shields, i.e., two symmetric laterally disposed side shields sandwiched above and below by a trailing shield (above) and leading shield (below). This configuration is designed and fabricated to improve both the field gradients in the down track and cross track directions as well as to improve the ATE (adjacent track erasure) performance. The prior art teaches several different shield designs to accomplish various types of improved writer performance. Examples are taught in Jiang et al. (U.S. Pat. No. 8,068,312), Yu et al. (U.S. Pat. No. 8,582,312) and Hsu et al. (U.S. Pat. No. 7,009,812).

FIG. 1 schematically shows the ABS (air bearing surface) of a rather typical prior art PMR writer with fully wrapped around shields. The components of this design include the write pole (10), two laterally disposed, mirror symmetric side shields (20), a trailing shield (30) "above" the pole and a leading shield (40) "below" the pole. Here "leading" refers to the direction into which a rotating recording medium moves relative to the ABS of the writer. The pole is separated from the shields by various gaps, typically filled with non-magnetic material. The gaps are denoted side gaps (25), leading edge gap (45) and write gap (35).

SUMMARY

It will be an object of the present disclosure to provide a PMR (perpendicular magnetic recording) writer with wrapped-around shields that provides improved performance relative to prior art designs in terms of write-field gradients in down track and cross track directions.

It will be a further object of the present disclosure to provide such a PMR writer that exhibits an improvement in adjacent track erasures (ATE) through their reduction.

It will be still a further object of the present disclosure to provide such a PMR writer that exhibits improved performance by lowering on-track bit error rate (BER).

It will be still a further object of the present disclosure to provide high flux writability before saturation sets in.

These objects will be achieved by the design and fabrication of a PMR writer with fully wrapped around shields but with a modification of the trailing shield that will provide the means of achieving the previously enumerated objects. Specifically, the presently disclosed PMR writer will have an improved trailing shield in terms of its material structure and shape, which will also allow formation of a narrow write gap near the ABS pole tip where a strong and well defined flux shape is desired for a given write current, but will reduce flux leakage between the shield and the pole above the pole tip. The improved shield shape will be produced by use of a layer of high saturation magnetic material formed on a leading edge of a trailing shield of lower saturation. This shape, which is non-conformal to the shape of the main pole (MP) above the ABS, will reduce flux leakage from pole to shield to provide a better return flux to the pole at the ABS and the use of a material with a higher saturation magnetization will eliminate the problem of premature pole tip saturation.

FIG. 2 shows an ABS view of the present PMR writer with fully wrapped around shields that differs from the illustration in (prior art) FIG. 1 in that a layer of magnetic material with high magnetic saturation (high $B_s$) has been placed on the leading edge portion (50) of the trailing edge shield. The components of this design include the write pole (10), two laterally disposed, mirror symmetric side shields (20), a trailing shield (30) "above" the pole and a leading shield (40) "below" the pole. Here "leading" refers to the direction into which a rotating recording medium moves relative to the ABS of the writer. The pole is separated from the shields by various gaps, typically filled with non-magnetic material. The gaps are denoted side gaps (25), leading edge gap (45) and write gap (35).

A layer of high saturation magnetic material ($B_s$=24 kG) (50), such as CoFe, lines the leading edge of the trailing shield and forms an upper boundary of the write gap (35). By contrast, the saturation fields of the remaining shields are $B_s$ between approximately 10 and 19 kG, formed by a magnetic material such as NiFe. In the remainder of this disclosure we will call this the additional leading edge layer of the trailing shield.

DETAILED DESCRIPTION

Figure 1:
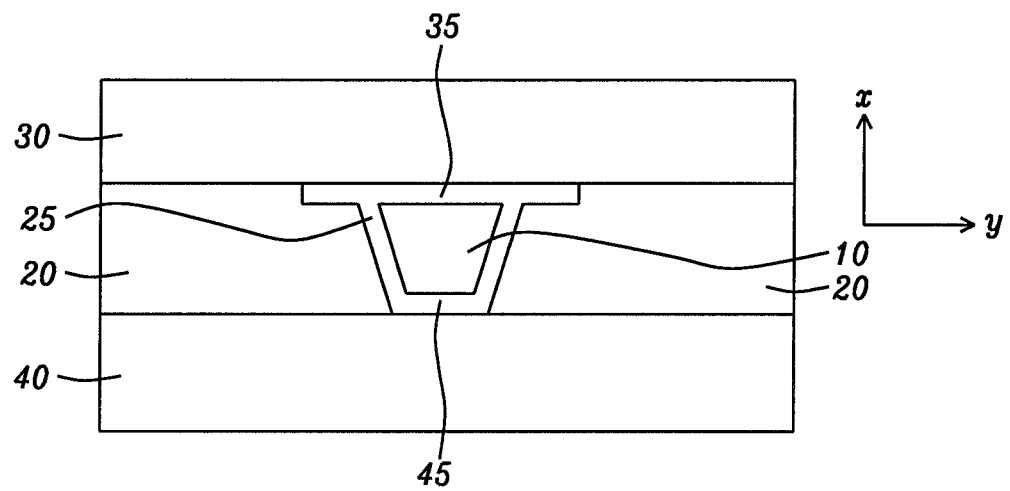
FIG. 1 is a schematic representation of an ABS view of a prior art PMR writer with wrapped-around shields.
Figure 2:
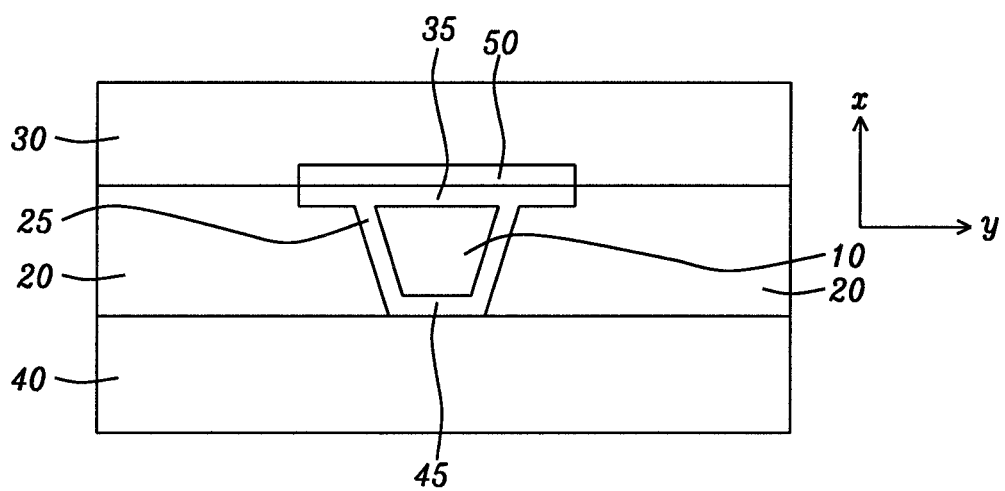
FIG. 2 is a schematic representation of an ABS view of the present PMR writer.
Figure 3:
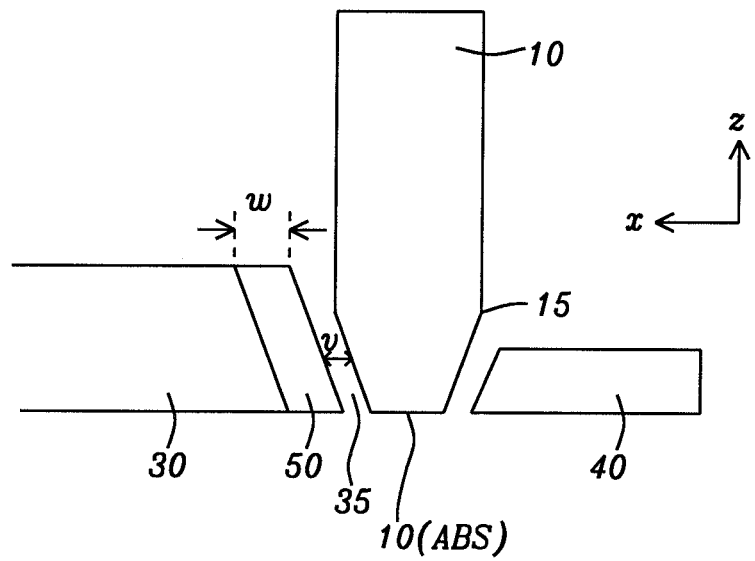
FIG. 3 is a schematic representation of a cross-sectional view of the PMR writer of FIG. 2, showing a first embodiment of a trailing shield where there is a leading edge layer formed on the trailing shield with a cross-sectional shape that is conformal with the cross-sectional shape of the write pole.
Figure 4:
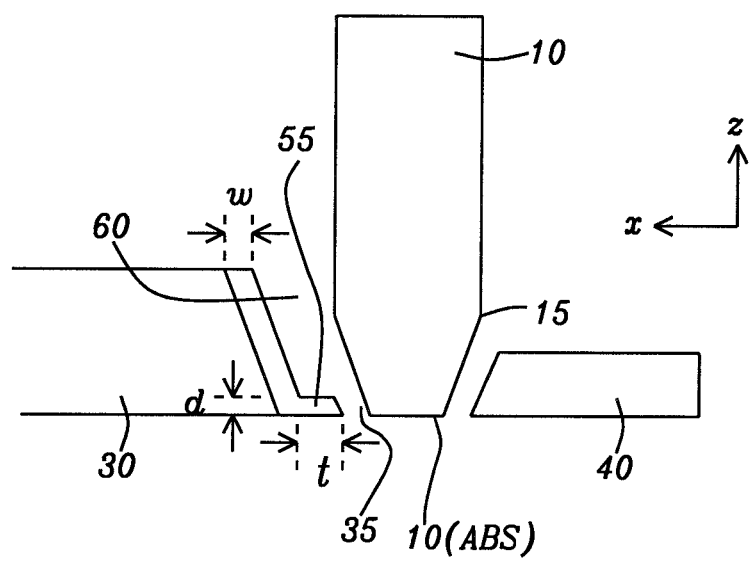
FIG. 4 is a schematic representation of a cross-sectional view of the PMR writer of FIG. 2, showing a second embodiment of a trailing shield where there is a leading edge layer formed on the trailing shield with a cross-sectional shape that is not conformal with the cross-sectional shape of the write pole.
Figure 5:
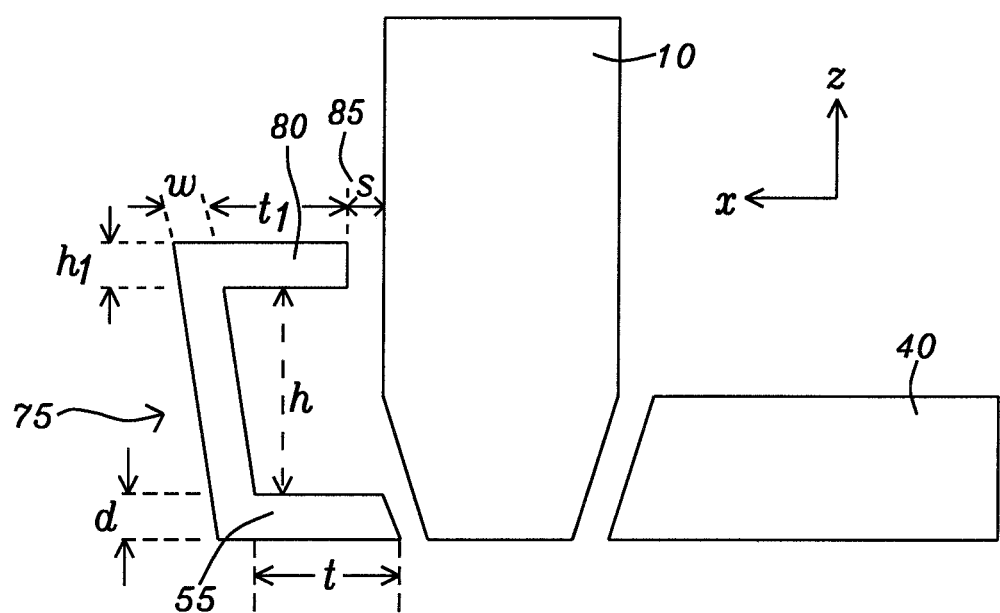
FIG. 5 is a schematic representation of a cross-sectional view of the PMR writer of FIG. 2, showing a third embodiment of a trailing shield where there is a leading edge layer formed on the trailing shield with a cross-sectional shape that is not conformal with the cross-sectional shape of the write pole.

FIGS. 3, 4 and 5 show three different trailing shield designs for the present PMR writer that differ in their cross-sectional shapes in a plane that is transverse to the ABS plane of FIG. 2. We will denote the ABS plane as the x-y plane, with x being the on-track direction and y being the cross-track direction. The transverse plane is then the x-z plane, with z being the direction away from the ABS and with negative x being the direction from the shield to the pole.

Referring first to schematic FIG. 3 which shows the x-z plane cross-section, the write gap (35) (WG) between the additional leading edge layer high $B_s$ portion (50) of the trailing shield and the main pole (MP) (10) is of uniform thickness, v, from the ABS (10) until the MP cut off point (15) where the pole taper stops. Typical thickness, w, of the shield layer (50) is between approximately 50 and 100 nm, with 80 nm being preferred. Due to the internal leakage between MP (10) and TS (50), the OW (overwrite capability or "writeability" of the pole) degrades dramatically when narrowing down the WG. The vertical extent of the narrow write-gap promotes an enhanced flux leakage from the pole to the trailing shield above the ABS end of the pole, thereby reducing the ability of the pole to produce effective writing at the ABS tip under high flux conditions.

Referring next to schematic FIG. 4, also showing the x-z plane cross-sectional shape of the trailing shield additional high $B_s$ layer, this non-conformal trailing shield design is of substantially uniform thickness, w, which is again between approximately 50 and 100 nm with 80 nm being preferred, but it has an additional step (55), of height d, between approximately 20 and 80 nm (in the z-direction) and thickness t between approximately 20 and 100 nm, with 40 nm being preferred (in the negative x-direction) which protrudes towards the magnetic pole and produces the non-conformity of the WG before the MP cut off point (15). The advantage of this non-conformal cross-sectional shape of the additional shield layer is that while the WG remains narrow (35) at the ABS (10) of the pole, the internal flux leakage is much reduced in the region behind the step (55) where the WG space (60) enlarges. Hence this design can improve OW at high flux and afford a narrower WG than the shape of the uniform and conformal additional trailing shield layer in FIG. 3.

The dimension of the tiny step of this trailing shield layer is defined by its thickness t and height d. Increasing t and decreasing d can improve the OW and narrow down WG thickness. But at a certain point, the magnetic field will saturate the tiny step (55) and further improvement will stop. Hence there is a dimensional limit for t and d in this design, namely t between approximately 20 and 100 nm (nanometers) and d between approximately 20 and 80 nm.

Referring now to FIG. 5, there is shown a further embodiment of the leading edge high $B_s$ trailing shield layer (75) in which an extended arm (80) is added close to the top of the TS. This arm is at a vertical height h, between approximately 100 and 400 nm with 200 nm being preferred above the step (55), which still remains. The arm (80) has an intrinsic height (thickness) $h_1$, and it extends to within a separation distance, s, (85) of the main pole (10) at a point above the ending of the pole taper. This extended arm (80) is, therefore, close to the MP and its function is to absorb extra flux from MP and, therefore, diminish the amount of flux flowing down to the TS step (55). Since this arm is also far, (d+h), (where d is between approximately 20 and 80 nm and h is between approximately 100 and 400 nm with 200 nm being preferred) from the ABS, it will have less impact on the OW, but it will reduce the flux to trailing shield step (55) and, therefore, diminish saturation at the ABS. By optimizing the dimensions of h, $h_1$ and s, this design can allow further increasing t and decreasing d for ADC (areal density capacity) improvement.

Dimensions suitable for optimizing the shield performance are h, between approximately 100 and 300 nm, $h_1$ between approximately 50 and 350 nm, s between approximately 10 and 100 nm and t between approximately 20 and 200 nm.

Fabrication of the shielded pole of FIGS. 3, 4 and 5 is accomplished using standard photolithographic processes. A photomask is used to create the design, substantially identical to the illustrations of FIGS. 3, 4 and 5, that includes regions into which the main pole is plated and surrounded above and below by the trailing and leading shield which are also plated.

Figure 6:
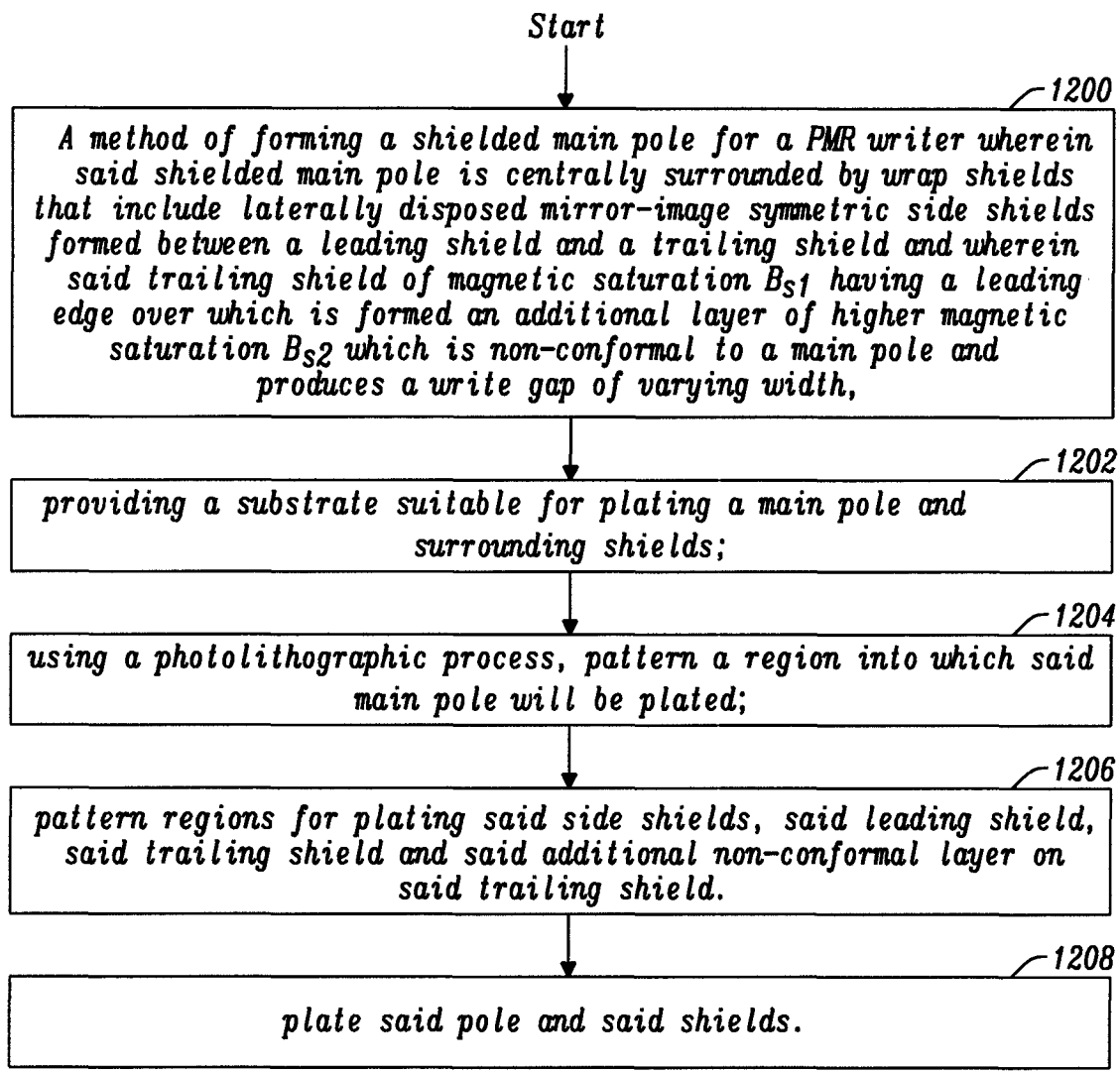
FIG. 6 is a flow chart describing a sequence of five steps required to fabricate the device of claim 1.

Referring to FIG. 6, there is shown a flow chart describing a sequence of process steps required to fabricate the device of claim 1.

Box 1200 describes the overall object of the process.

Box 1202 describes that the process is a plating process in which forms for plating the elements of the device are created in a substrate by means of photolithography.

Box 1204 patterns and creates the basic shape of a magnetic pole.

Box 1206 patterns and creates the basic shapes surrounding the magnetic pole, side shields, a leading shield, a trailing shield and additional non-conformal shield layers to be plated onto the trailing shield.

Box 1208 proceeds with the actual plating process.

As is understood by a person skilled in the art, the present description is illustrative of the present disclosure rather than limiting of the present disclosure. Revisions and modifications may be made to methods, materials, structures and dimensions employed in forming and providing a PMR writer with wrap around shields including a trailing shield that reduces flux saturation at the ABS, while still forming and providing such a structure and its method of formation in accord with the spirit and scope of the present disclosure as defined by the appended claims.

What is claimed is:

1. A method of forming a shielded magnetic pole for a PMR writer wherein said shielded magnetic pole is centrally surrounded by wrap-around shields that include laterally disposed mirror-image symmetric side shields formed between a leading shield and a trailing shield and wherein said trailing shield is formed of magnetic material of magnetic saturation $B_{s1}$ and has a leading edge that is parallel to a tapered trailing edge of said magnetic pole but extends proximally beyond said tapered trailing edge, over which leading edge is formed an additional layer of higher magnetic saturation $B_{S2}$ which additional layer has a leading edge that is non-conformal to the tapered trailing edge and wherein said non-conformity produces a write gap of varying width between the additional layer and the tapered trailing edge, said method comprising:

providing a substrate suitable for plating a magnetic pole and surrounding shields;

using a photolithographic process, patterning a region of said substrate into which said magnetic pole will be plated;

patterning regions for plating said side shields, said leading shield, said trailing shield and said additional layer on said leading edge of said trailing shield; and plating said magnetic pole, said shields and said additional layer wherein said additional layer is formed as a continuous layer from whose air-bearing surface (ABS) end a step protrudes in an on-track direction for an additional distance t, towards said magnetic pole, and wherein said step has a height d in a direction orthogonal to the ABS, and wherein said additional layer is of substantially uniform thickness w in the on-track direction for the remainder of its height above said step.

2. The method of claim 1 wherein $B_{s1}$ is between approximately 10 and 19 kG (kiloGauss) and $B_{s2}$ is approximately 24 kG.

3. The method of claim 1 wherein a material for said mirror-image symmetric side shields is NiFe.

4. The method of claim 1 wherein a material for said additional layer is CoFe.

5. The method of claim 1 wherein t is between approximately 20 and 100 nm and d is between approximately 20 and 80 nm and the thickness, w, is between approximately 50 and 100 nm.

6. The method of claim 1 wherein said additional layer further comprises an arm protruding from an upper end thereof and the on-track direction towards said magnetic pole, wherein said arm and said step are substantially parallel, separated in the direction orthogonal to the ABS by a height h, and wherein said arm protrudes a distance $t_1$ to within a distance s, of the magnetic pole, wherein said arm has a height $h_1$ in the direction orthogonal to the ABS.

7. The method of claim 6 wherein h is between approximately 100 and 300 nm, wherein $t_1$ is between approximately 20 and 200 nm, wherein $h_1$ is between approximately 50 and 350 nm, wherein t is between approximately 20 and 100 nm and d is between approximately 20 and 80 nm and the thickness, w, is between approximately 50 and 100 nm and wherein s is between 10 and 100 nanometers.

* * * * *